United States Patent
Young et al.

(10) Patent No.: US 10,944,555 B2
(45) Date of Patent: Mar. 9, 2021

(54) SECURE METHODS AND SYSTEMS FOR IDENTIFYING BLUETOOTH CONNECTED DEVICES WITH INSTALLED APPLICATION

(71) Applicant: Bose Corporation, Framingham, MA (US)

(72) Inventors: Douglas Warren Young, Arlington, MA (US); Prasanna Rao, Boston, MA (US); Jim Lambert, Milford, MA (US); Niall Tone Kavanagh, Sharon, MA (US); Matthew Jannace, Bedford, MA (US)

(73) Assignee: Bose Corporation, Framingham, MA (US)

( * ) Notice: Subject to any disclaimer, the term of this patent is extended or adjusted under 35 U.S.C. 154(b) by 155 days.

(21) Appl. No.: 15/982,723

(22) Filed: May 17, 2018

(65) Prior Publication Data

US 2019/0356485 A1 Nov. 21, 2019

(51) Int. Cl.
*H04L 9/32* (2006.01)
*H04L 9/08* (2006.01)
(Continued)

(52) U.S. Cl.
CPC .......... *H04L 9/0869* (2013.01); *H04L 9/3228* (2013.01); *H04R 1/1041* (2013.01);
(Continued)

(58) Field of Classification Search
CPC ... H04L 9/3228; H04L 9/3226; H04L 9/0825; H04L 9/0838; H04L 9/3242;
(Continued)

(56) References Cited

U.S. PATENT DOCUMENTS 6,931,132 B2 * 8/2005 Billhartz ............. H04L 63/0435
380/260
7,742,740 B2 6/2010 Goldberg et al.
(Continued)

FOREIGN PATENT DOCUMENTS

EP 2645665 10/2013
EP 2720404 4/2014
(Continued)

OTHER PUBLICATIONS

Argenox; A BLE Advertising Primer; Argenox Technologies LLC; 2016; Website available at: http://www.argenox.com/a-ble-advertising-primer/.

(Continued)

*Primary Examiner* — Amare F Tabor
(74) *Attorney, Agent, or Firm* — Bond, Schoeneck & King, PLLC (57) ABSTRACT

A system and method for securely verifying a connection between a remote device and an audio device. The method includes establishing a wireless connection between the remote device and the audio device. The remote device has an application configured to control operation of the audio device. An identity resolving key (IRK) for the application is obtained with the remote device. The IRK is transmitted to the audio device via the wireless connection. An instruction to is transmitted the audio device to generate a random resolvable address for the application using the IRK and to broadcast data containing the random resolvable address. The data containing the random resolvable address is received by the application of the remote device. An active audio connection between the remote device and the audio device is identified if the random resolvable address is able to be resolved by the application using the IRK.

20 Claims, 3 Drawing Sheets

(51) Int. Cl.
*H04R 1/10* (2006.01)
*H04W 4/80* (2018.01)
*H04W 12/04* (2021.01)
*H04W 84/18* (2009.01)

(52) U.S. Cl.
CPC .... *H04L 2209/805* (2013.01); *H04R 2420/07* (2013.01); *H04W 4/80* (2018.02); *H04W 12/04* (2013.01); *H04W 84/18* (2013.01)

(58) Field of Classification Search
CPC . H04L 9/0869; H04L 9/2209; H04L 2209/42; H04W 12/0051; H04W 12/0609; H04W 84/18; H04W 12/04; H04W 4/80; H04R 1/1041; H04R 2420/07
USPC .......................................................... 713/171
See application file for complete search history.

(56) References Cited

U.S. PATENT DOCUMENTS

| | | | |
|---|---|---|---|
| 7,865,137 B2 | 1/2011 | Goldberg et al. | |
| 7,916,877 B2 | 3/2011 | Goldberg et al. | |
| 7,917,082 B2 | 3/2011 | Goldberg et al. | |
| 8,001,584 B2* | 8/2011 | Lortz | H04L 63/0807 713/156 |
| 8,023,663 B2 | 9/2011 | Goldberg | |
| 8,170,486 B2 | 5/2012 | Olofsson | |
| 8,391,792 B2 | 3/2013 | Glezerman et al. | |
| 8,433,243 B2 | 4/2013 | Sharma | |
| 8,706,038 B2 | 4/2014 | Sharma | |
| 8,719,573 B2* | 5/2014 | Ran | H04L 9/0861 713/170 |
| 8,768,252 B2 | 7/2014 | Watson et al. | |
| 8,826,015 B2* | 9/2014 | Lakshminarayanan | G06F 21/445 380/278 |
| 8,923,747 B2 | 12/2014 | Tan et al. | |
| 8,989,706 B2* | 3/2015 | Ananthanarayanan | H04W 12/06 455/411 |
| 9,107,069 B2* | 8/2015 | Engelien-Lopes | H04W 12/04 |
| 9,191,988 B2 | 11/2015 | Newham | |
| 9,544,689 B2 | 1/2017 | Fisher et al. | |
| 9,820,132 B2* | 11/2017 | Palin | H04W 8/005 |
| 9,820,323 B1 | 11/2017 | Young et al. | |
| 10,237,317 B2* | 3/2019 | Celinski | G06F 3/162 |
| 10,505,907 B2* | 12/2019 | Jarchafjian | H04W 4/023 |
| 2006/0242412 A1* | 10/2006 | Jung | H04L 63/061 713/171 |
| 2008/0089519 A1* | 4/2008 | Ekberg | H04W 12/04 380/270 |
| 2009/0154739 A1 | 6/2009 | Zellner | |
| 2009/0238375 A1 | 9/2009 | Pilati et al. | |
| 2010/0284389 A1 | 11/2010 | Ramsay et al. | |
| 2012/0087503 A1 | 4/2012 | Watson et al. | |
| 2013/0198086 A1* | 8/2013 | Mardikar | G06Q 20/4012 705/71 |
| 2013/0279715 A1 | 10/2013 | Tan | |
| 2016/0095047 A1 | 3/2016 | Lee et al. | |
| 2017/0083284 A1 | 3/2017 | Fisher et al. | |
| 2017/0201886 A1* | 7/2017 | Yang | H04W 12/003 |
| 2018/0270050 A1* | 9/2018 | Ohtani | H04L 9/0819 |
| 2019/0215369 A1* | 7/2019 | Pry | H04L 67/12 |

FOREIGN PATENT DOCUMENTS

| | | |
|---|---|---|
| GB | 2382952 A | 6/2003 |
| WO | 2017003337 | 1/2017 |

OTHER PUBLICATIONS

KBA_BT_0201: Bluetooth advertising data basics; Silicon Laboratories; Feb. 10, 2017; Website available at: https://www.silabs.com/community/wireless/bluetooth/knowledge-base.entry.html/2017/02/10/bluetooth_advertisin-hGsf.

Abraham; Understanding Bluetooth Advertising Packets; Jun. 4, 2017; Website available at: http://j2abro.blogspot.com/2014/06/understanding-bluetooth-advertising.html?m=1.

Warne; Bluetooth Low Energy—It starts with Advertising; Feb. 15, 2017; Website available at: https://blog.bluetooth.com/bluetooth-low-energy-it-starts-with-advertising.

Lindh; Bluetooth® low energy Beacons; Texas Instruments Application Report; Jan. 2015; Available at: http://www.ti.com/lit/an/swra475a/swra475a.pdf.

International Search Report and the Written Opinion of the International Searching Authority, International Application No. PCT/US2019/029899, pp. 1-18, dated Jul. 9, 2019.

International Preliminary Report on Patentability, International Application No. PCT/US2019/029899, pp. 1-14, dated Nov. 17, 2020.

* cited by examiner

SECURE METHODS AND SYSTEMS FOR IDENTIFYING BLUETOOTH CONNECTED DEVICES WITH INSTALLED APPLICATION

BACKGROUND

The disclosure relates to wireless audio systems and related devices and methods, and, particularly, to secure systems and methods for identifying Bluetooth connected audio devices.

SUMMARY

All examples and features mentioned below can be combined in any technically possible way.

In one aspect, a method for securely verifying a connection between a remote device and an audio device includes establishing a wireless connection between the remote device and the audio device, the remote device having an application configured to control operation of the audio device; obtaining an identity resolving key (IRK) for the application; transmitting the IRK to the audio device from the application; transmitting an instruction to the audio device from the application to generate a random resolvable address for the application using the IRK and to broadcast data containing the random resolvable address; receiving the data containing the random resolvable address by the application of the remote device; and verifying connection of the remote device to the audio device via the wireless connection if the random resolvable address is able to be resolved by the application using the IRK.

Examples may include generating the IRK with the application or receiving the IRK from an authentication server.

Examples may include establishing an application layer wireless connection between the application and the audio device, wherein transmitting the IRK, transmitting the instruction, and receiving the data are performed with respect to the application layer wireless connection.

Examples may include the wireless connection arranged as a classic Bluetooth connection and the application layer wireless connection includes a Bluetooth Low Energy connection.

Examples may further include establishing a data connection between the remote device and an authentication server, transmitting the IRK to the authentication server via the data connection, encrypting the IRK with the authentication server, and transmitting the IRK in an encrypted state to the application via the data connection, and wherein transmitting the IRK to the audio device includes transmitting the IRK in the encrypted state, and the encrypted state is signed.

Examples may further include completing an end-to-end authentication process between the audio device and the authentication server, and wherein the encrypting includes encrypting the IRK using a shared secret from the end-to-end authentication process.

Examples may further include providing authentication credentials to the authentication server via the data connection, and wherein completing the end-to-end authentication process includes using the remote device as a relay between the audio device and the authentication server only upon acceptance by the authentication server of the authentication credentials.

Examples may further include, after the verifying, automatically transmitting audio data and an instruction to process the audio data to the audio device from the remote device, updating a user interface of the application to indicate the wireless connection, or a combination including at least one of the foregoing.

Examples may include the instruction configured to instruct the audio device to insert the random resolvable address in a Bluetooth Low Energy (BLE) advertising packet and the data includes the BLE advertising packet.

Examples may include the random resolvable address received by the application as a first random resolvable address and the BLE advertising packet includes a random number that is refreshed periodically that is received by the application while receiving the data, and wherein the verifying includes generating a second random resolvable address with the application using the random number and the IRK and determining whether the second random resolvable address matches the first random resolvable address.

Examples may include the random number, the random resolvable address, or both, stored in a manufacturer specific data field of the BLE advertising packet.

In one aspect, a method for securely verifying a connection between a remote device and an audio device includes establishing a wireless connection between the remote device and the audio device, the remote device having an application configured to control operation of the audio device; obtaining an identity resolving key (IRK) for the application with the remote device; transmitting the IRK to the audio device via the wireless connection; generating, by the audio device, a random resolvable address for the application using the IRK; broadcasting data containing the random resolvable address with the audio device; receiving the data with the application of the remote device; and verifying connection of the remote device to the audio device if the random resolvable address is able to be resolved by the application using the IRK.

In one aspect, an audio system includes a remote device having a wireless transceiver configured to establish a wireless connection with an audio device, a memory module, and an application, configured to control operation of the audio device, installed in the memory module, the remote device configured to obtain an identity resolving key (IRK) for the application and to transmit the IRK to the audio device; wherein the application is configured to instruct the audio device to (i) generate a random resolvable address for the application using the IRK and (ii) broadcast data that includes the random resolvable address, to receive the data, and to identify whether an active audio connection exists between the remote device and the audio device if the random resolvable address is able to be resolved by application using the IRK.

Examples may include the application configured to communicate with the audio device via a Bluetooth Low Energy (BLE) connection, and the connection between the remote device and the audio device verified by the application includes a classic Bluetooth connection.

Examples may include the application configured to automatically, after identifying whether the active audio connection exists, retrieve settings from the audio device, transmit instructions to control the settings or other operations of the audio device, update a user interface of the application to indicate the active audio connection, or a combination including at least one of the foregoing.

Examples may include the application configured to receive the random resolvable address as a first random resolvable address, to generate a second random resolvable address using the IRK and a random number contained in the broadcast data, and wherein the application is configured to verify the connection by determining whether the second random resolvable address matches the first random resolvable address.

In another aspect, an audio system includes an audio device having a first wireless transceiver; and a remote device having a second wireless transceiver configured to establish a wireless connection with the audio device, a memory, and an application configured to control operation of the audio device installed in the memory, the remote device configured to generate an identity resolving key (IRK) for the application and to transmit the IRK to the audio device; wherein the audio device is configured to generate a random resolvable address for the application using the IRK and to broadcast data that includes the random resolvable address; and wherein the application is configured to receive the data and verify a connection between the remote device and the audio device if the random resolvable address is able to be resolved by application using the IRK.

Examples may include the audio device configured to insert the random resolvable address into a Bluetooth Low Energy (BLE) advertising packet and the data includes the BLE advertising packet.

Examples may include an authentication server, wherein the application is configured to request the IRK from the authentication server and the authentication server is configured to generate the IRK.

Examples may include the authentication server configured transmit the IRK to the application only after completion of an end-to-end authentication process with the audio device using the remote device as a relay.

DETAILED DESCRIPTION

The present disclosure describes various systems and methods for identifying a connected audio device and/or verifying a connection between the audio device and a remote device using a connectivity and control application for the audio device installed on the remote device.

There is a desire for the connectivity and control application installed on the remote device to automatically detect headsets, speakers, eyeglasses, or other audio devices that are currently connected to the remote device that the application is running on, and further, to update the user interface (UI) of the application to reflect that the audio device is connected. However, in some circumstances, an application on the remote device cannot obtain identifying information from the audio device wirelessly connected to the remote device, e.g., over Bluetooth. For example, applications installed devices that are not compliant with Apple's "Made for iPhone/iPod/iPad" (MFi) platform cannot communicate with Bluetooth-enabled products except over Bluetooth Low Energy (BLE). There are currently no APIs for an application to determine whether a given BLE-enabled audio device is also connected to an Apple® iOS remote device over classic Bluetooth.

The connectivity/control application could address this issue by placing the remote device's MAC address in the payload of the audio device's BLE advertising packet. After connecting to the audio device for the first time, the application could learn and store the MAC address of the remote device that the application was running on. Thereafter, when performing a BLE scan, the application could look for received BLE advertising packets that contain the corresponding MAC address. When a match is found, the application could connect to the audio device over BLE and update its UI to reflect the active connection. However, this would require static uniquely identifying information (the MAC address) to be stored in the advertising packet, which would enable one or both of the devices to be tracked by untrusted or malicious BLE scanners.

As discussed in more detail below, the systems and methods disclosed herein generate and store a random resolvable address for each instance of the application in the audio device's advertising packet, rather than the MAC address of the remote device itself. This enables applications on any operating system, including applications on the iOS operating system, to perform a BLE scan and determine that a given audio device (including any non-MFi audio device), is connected to the remote device over classic Bluetooth and to update its UI/initiate a BLE connection to enable the user to interact with the audio device. Advantageously, this is accomplished securely and prevents the devices from being tracked by third party BLE scanners.

Figure 1:
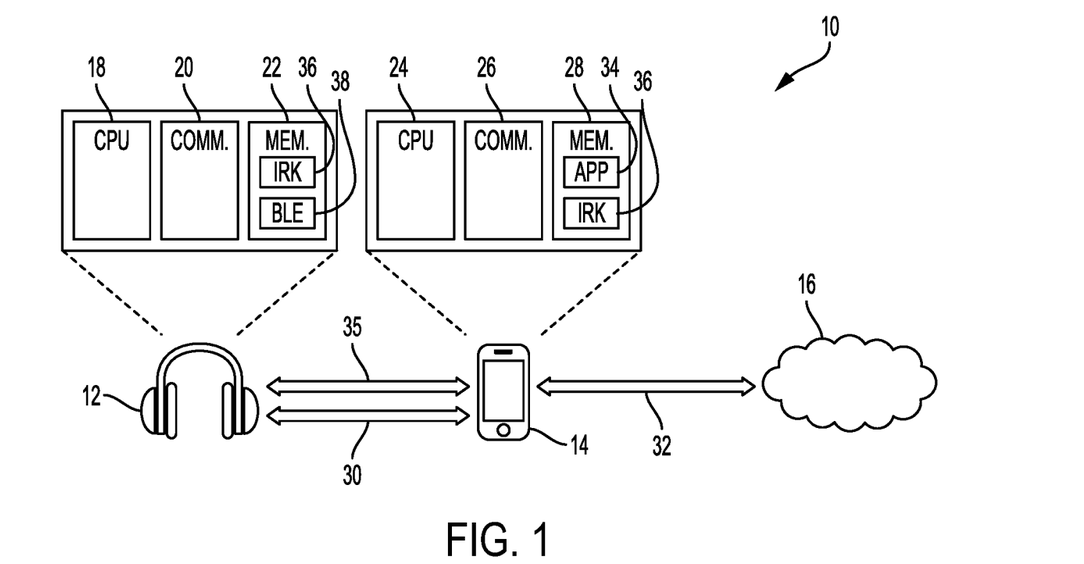
FIG. 1 schematically illustrates a system for verifying a wireless connection between a remote device and an audio device using an application installed on the remote device according to one example disclosed herein.

FIG. 1 depicts an audio system 10 that includes an audio device 12 and a remote device 14 for providing audio to the audio device 12 and/or controlling certain operations of the audio device 12. The audio device 12 may include headphones (as shown in FIG. 1), a headset, earbuds, earpieces, speakers, eyeglasses, or any other device configured to produce sound from audio data. The remote device 14 may be or include any wireless-enabled audio source capable of transmitting audio data, such as a smartphone (as shown in FIG. 1), tablet, laptop, etc. The system 10 may also include a server 16, e.g., a network-, internet-, or cloud-based server, configured to facilitate secure transactions between the audio device 12 and the remote device 14, as discussed in more detail herein.

The audio device 12 may include a processor or CPU 18, a communication module 20, and a memory module 22, while the remote device 14 may include a processor or CPU 24, a communication module 26, and a memory module 28. It is to be appreciated that the server 16 may additionally include any combination of these or other computing resources (e.g., cloud-based computing resources). The processors 18 and 24 may each take any suitable form, such as a microcontroller, plural microcontrollers, circuitry, a single processor, or plural processors configured to execute software instructions.

The communication modules 20 and 26 are configured to establish a wireless connection 30 between the audio device 12 and the remote device 14. The communication modules 20 and 26 may be any module, device, transceiver, radio, or means capable of enabling the transmission and/or reception of a wireless communication signal. In one example, the communication modules 20 and 26 each include a radio frequency antenna coupled with a Bluetooth chipset. The communication module 26 is additionally configured to establish a data connection 32 with the server 16, and may utilize any wired or wireless technology (or combinations thereof), including but not limited to Wi-Fi (e.g., IEEE 802.11), Bluetooth, cellular, Ethernet, etc. For example, the data connection 32 may be established over the internet using any number of network devices or infrastructure.

The memory modules 22 and 28 may each take any suitable form or forms, including volatile memory, such as random access memory (RAM), or non-volatile memory such as read only memory (ROM), flash memory, a hard disk drive (HDD), a solid state drive (SSD), or other data storage media. The memory modules 22 and 28 may be used by the processors 18 and 24, respectively, for the temporary storage of data during their operation. Data and software, such as the algorithms or software necessary to perform the methods and provide the functionality discussed herein, as well as an operating system, firmware, or other application, may be installed in the memory modules 22 and 28.

The remote device 14 includes an application 34 stored in the memory module 28 that facilitates and/or controls connection with, transmission to, and/or control of the audio device 12. In one example, the application 34 includes the Bose® Connect application. As noted above, in some circumstances (e.g., when using Apple® iOS on the remote device 14) the application 34 may not have access to information that indicates whether or not the audio device 12 and the remote device 14 are actively connected via the connection 30 (e.g., via a Classic Bluetooth connection). According to the methods and systems disclosed herein, once the application 34 identifies whether the connection 30 exists as an active audio connection between the remote device 14 and the audio device 12, the application 34 may also connect to the audio device 12, e.g., via an application layer wireless connection 35. If the connection 30 is not identified by the application 34, then the application 34 may not initiate the wireless connection 35 to allow other applications to discover and/or connect to the audio device 12. The connection 30 may include a classic Bluetooth connection between the audio device 12 and the remote device 14, while the application layer connection 35 may include a BLE connection that utilizes any desired mobile application part (MAP) protocols.

Since the application 34 is installed on the remote device 14, it is to be appreciated that functionality, operational steps, etc. attributed to the remote device 14 may generally include use of the application 34, and that functionality, operational steps, etc., attributed to the application 34 may be carried out by physical components of the remote device 14. For example, the connections 30 and 35 may both be initiated by the application 34 and/or established by the same physical layer components, e.g., the communication module 26.

The application 34 is associated with a corresponding identity resolving key (IRK) 36 (or "app IRK 36"). The identity resolving key 36 may include any string of characters that can be used to generate and resolve a random resolvable address according to an encryption technique or methodology, such as Advanced Encryption Standard (AES). In one example, the app IRK 36 is a 128-bit key intended for use with AES-128. The app IRK 36 may be obtained or generated by the application 34 for storage in the memory module 28 in any desired manner. As used herein, the terms "generate" and "obtain" are intended to include obtaining by directly generating the IRK as well as obtaining by indirectly generating the IRK, e.g., by requesting another device to perform the generating or to otherwise obtain an IRK generated by another device. In one example, the application 34 is configured to generate the app IRK 36. In another example, the application 34 is configured to request the app IRK 36 from the server 16.

The application 34 is configured to send the app IRK 36 to the audio device 12 (e.g., via the communication modules 20 and 26, and the wireless connection 35, as discussed above). The audio device 12 may store the app IRK 36 in the memory module 22. The audio device 12 is configured to use the app IRK 36 to generate (e.g., with the processor 18) a corresponding random resolvable address for the application 34. In accordance with examples discussed in more detail below, the random resolvable address for the application 34 may be stored in the memory module 22, such as in the payload of an advertising packet 38 or other publicly broadcast data.

Figure 2:
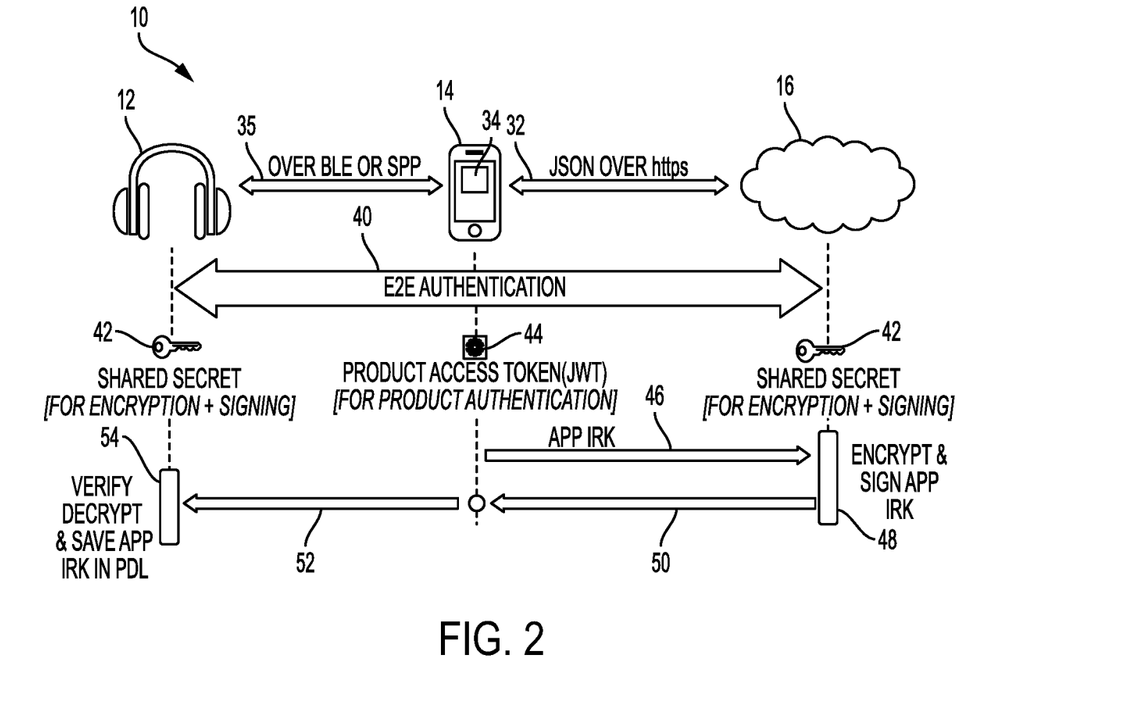
FIG. 2 illustrates a flow chart for securely transmitting an identity resolving key from an application of a remote device to an audio device according to one example disclosed herein.

If the audio device 12 and the remote device 14 are securely paired together, e.g., via Bluetooth Low Energy (BLE) specifications, the application 34 may transfer the app IRK 36 over this connection. However, if increased security is desired, the server 16 may be utilized. One method of using the server 16 to provide increased security while transmitting the app IRK 36 from the application 34 to the audio device 12 is illustrated in FIG. 2. In this example, the wireless connection 35 may be established by the application 34 via any desired or applicable mobile protocols over a BLE and/or Serial Port Profile (SPP) connection, while the data connection 32 may be established via JavaScript Object Notation (JSON) over a secure hypertext transfer protocol (HTTPS). Those of ordinary skill in the art will recognize other protocols, standards, specifications, and/or technology that may be used to establish and/or transfer data over the connections 35 and 32.

In the example of FIG. 2, it is assumed that the server 16 is an authentication server, e.g., owned or operated by the manufacturer of the audio device 12. In this way, when the application 34 first connects to the audio device 12, the audio device 12 can be authenticated as genuine by the server 16 via an end-to-end (E2E) authentication process 40. Authentication may be accomplished using pre-established unique identifier for the audio device 12, such as a globally unique identity (GUID), as well as public and private key pairs, which are known to the server 16 and the audio device 12. For example, the GUID and key pair may be generated as part of the manufacturing process for the audio device 12 and distributed to the server 16 and the audio device 12.

As part of the E2E authentication process 40, the server 16 may complete handshaking according to a pre-established process (e.g., using the GUID and key pair, as noted above) that results in the exchange of a shared secret 42 with the audio device 12. For example, the shared secret 42 may be an encryption key that enables communications between the audio device 12 and the server 16 to be securely encrypted, decrypted, and/or signed. Since the communications are encrypted by the shared secret 42, which is securely known by the audio device 12 and the server 16, the remote device 14 can be securely used as a relay to transfer encrypted communications. As an additional step, the user may be required to enter user credentials to the server 16, such as a user name and password, in order to authorize the remote device 14 and/or the application 34 to act as a relay. This may generate an access token 44 that is returned to the application 34, e.g., a JSON Web Token if JSON is employed for the data connection 32, and which may be used for future authentications.

At step 46 in FIG. 2, the application 34 sends the app IRK 36 to server 16 requests the server 16 to encrypt the app IRK 36. The server 16 may encrypt and sign the app IRK at step 48 (e.g., using the shared secret 42 negotiated as part of the E2E authentication process 40). At step 50, the encrypted version of the app IRK 36 is sent back to the application 34, which forwards the encrypted app IRK 36, e.g., through applicable mobile application protocols, to the audio device 12 at step 52. The audio device 12 may verify the communication and decrypt the app IRK 36 (e.g., via the shared secret 42) at step 54. The decrypted app IRK 36 may then be stored in the memory module 22. The audio device 12 may use the app IRK 36 to generate a random resolvable address for the application 34.

The random resolvable address for the application 34 generated by the audio device 12 may be included in data publicly broadcasted by the audio device 12, such as inserted into the BLE advertising packets broadcast by the audio device 12. An example of the BLE advertising packet 38 (stored in the memory module 22 of the audio device 12, as noted above) is illustrated in more detail FIG. 3. The random resolvable address generated using the app IRK 36 may be stored in a publicly accessible field of the advertising packet 38, such as a manufacturer specific data field 56.

Figure 3:
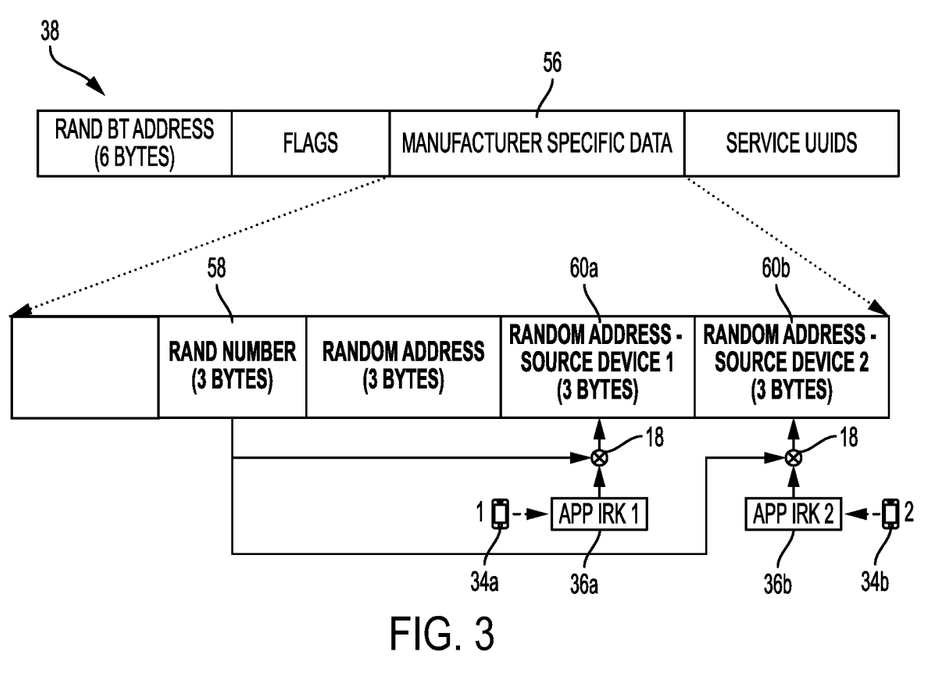
FIG. 3 schematically illustrates an advertising packet and manner of generating random resolvable addresses and inserting them into fields of the advertising packet according to one example disclosed herein.

Data entries in the manufacturer specific data field 56 may include a random number 58 and a random resolvable address 60 for each connected instance of the application 34. For example, in the illustrated example, the address 60 includes a first random resolvable address 60a and a second random resolvable address 60b. It is to be appreciated that the alphabetic suffixes ('a', 'b') are used with respect to common base numerals to indicate particular instances of the corresponding component or element, but that any description with respect to the base numeral without suffixes shall apply to all uses of the base numeral regardless of suffix (e.g., the random resolvable addresses 60a and 60b are specific instances for the random resolvable address 60 in general). Multiple random resolvable addresses 60 may be advantageously stored if the audio device 12 is able to connect to multiple devices and/or applications simultaneously.

In addition to the contents of the advertising packet 38, FIG. 3 schematically illustrates how the audio device 12 may generate the random resolvable address 60 for entry into the data field 56. The generation of the random resolvable addresses 60 may be achieved by retrieving the random number 58, and encrypting the random number 58 with the corresponding app IRK 36, e.g., via the processor 18 of the audio device 12. In this example, the first random resolvable address 60a is associated with a first application 34a and generated from a first app IRK 36a, while the second random resolvable address 60b is generated from a second app IRK 36b and associated with a second application 34b.

In one example, the random resolvable address 60 includes a six byte character string, with the first half (three bytes) of the random resolvable address including the random number 58. The random number 58 is encrypted with the corresponding instance of the app IRK 36 (e.g., the app IRK 36a for the application 34a, the app IRK 36b for the application 34b, etc.). The least significant three bytes of the encrypted payload may be used as the second half of the random resolvable address 60. The random seed for generating the random number 58 can be refreshed periodically, e.g., every 15 minutes or other desired time period, to prevent tracking of any particular device over time. The random resolvable address 60 can also be updated periodically, e.g., each time the random number 58 is refreshed. As noted above, those of ordinary skill in the art will appreciate other methods for generating a random number and/or random resolvable address.

In this way, the random resolvable address 60 for the application 34 may be generated by the audio device 12, stored in the corresponding section of the data field 56, and therefore broadcast with the BLE advertising packet 38 each time the audio device 12 re-connects to the application 34. The random resolvable address 60 can be removed from the data field 56 when the audio device 12 and the application 34 are disconnected. For example, if the audio device 12 first connects to the application 34a, then the random resolvable address 60a for the application 34a can be generated from the app IRK 36a and inserted into the data field 56, where it is then broadcast as part of the BLE advertising packet 38. If the application 34a disconnects, and the application 34b connects, then the random resolvable address 60a may be removed and the random resolvable address 60b generated from the app IRK 36b inserted. If both the applications 34a and 34b are connected, then the random resolvable addresses 60a and 60b can both be broadcast as part of the BLE advertising packet 38.

Figure 4:
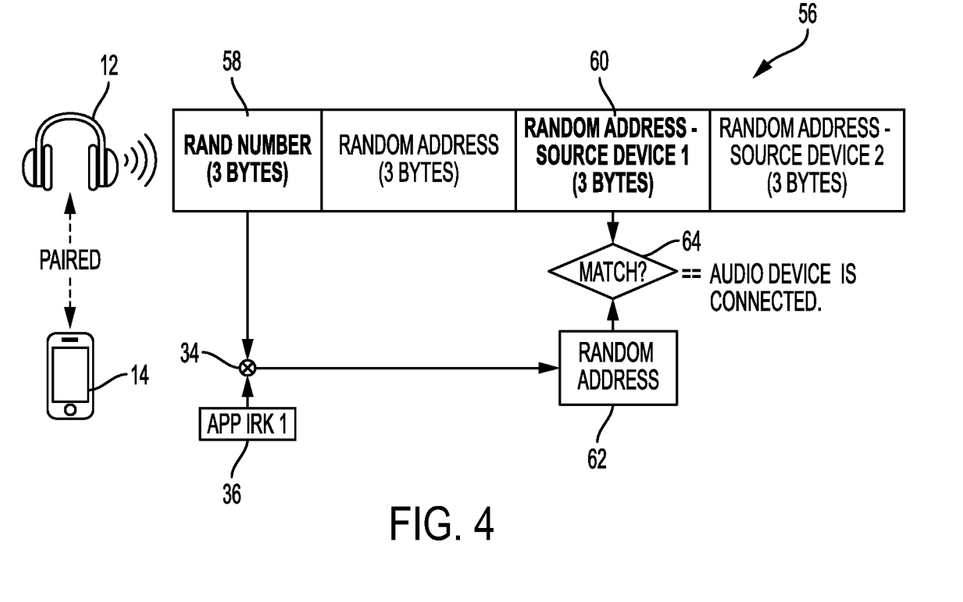
FIG. 4 is a block diagram illustrating a method and system for verifying whether a remote device has connected to an audio device according to one example disclosed herein.

As shown in FIG. 4, the random resolvable address 60 may be used by the application 34 to verify that the audio device 12 has indeed connected to the remote device 14 on which the application 34 is installed. That is, the application 34 may receive the BLE advertising packet 38 and check it to see if the random resolvable address 60 corresponds to its own app IRK 36. For example, as illustrated in FIG. 4, the audio device 12 is paired to the remote device 14. The application 34 may retrieve the random number 58 of the BLE advertising packet 38 and use the random number 58 to generate a random resolvable address 62 using the app IRK 36 (e.g., using the processor 24). The application 34 may also retrieve the random resolvable address 60, which can be compared at step 64 to the random resolvable address 62 (e.g., using the processor 24). If the random resolvable address 60 matches the random resolvable address 62, then the application 34 can determine that the remote device 14 (on which the application 34 is installed) is properly connected to the audio device 12.

Once the connection (e.g., a classic Bluetooth connection) between the audio device 12 and the remote device 14 has been verified, the application 34 may initiate a suitable action, such as automatically connecting to the audio device 12 with desired protocols and/or channels over BLE, transferring audio data and/or instructing the audio device 12 to play audio data, e.g., from a user-playlist, or other action, which may be pre-set and/or based on stored user preferences. The application may also update its user interface (e.g., displayed by a screen of the remote device 14) to reflect the connection, e.g., the wireless connection 30, has been established with the audio device 12.

Figure 5:
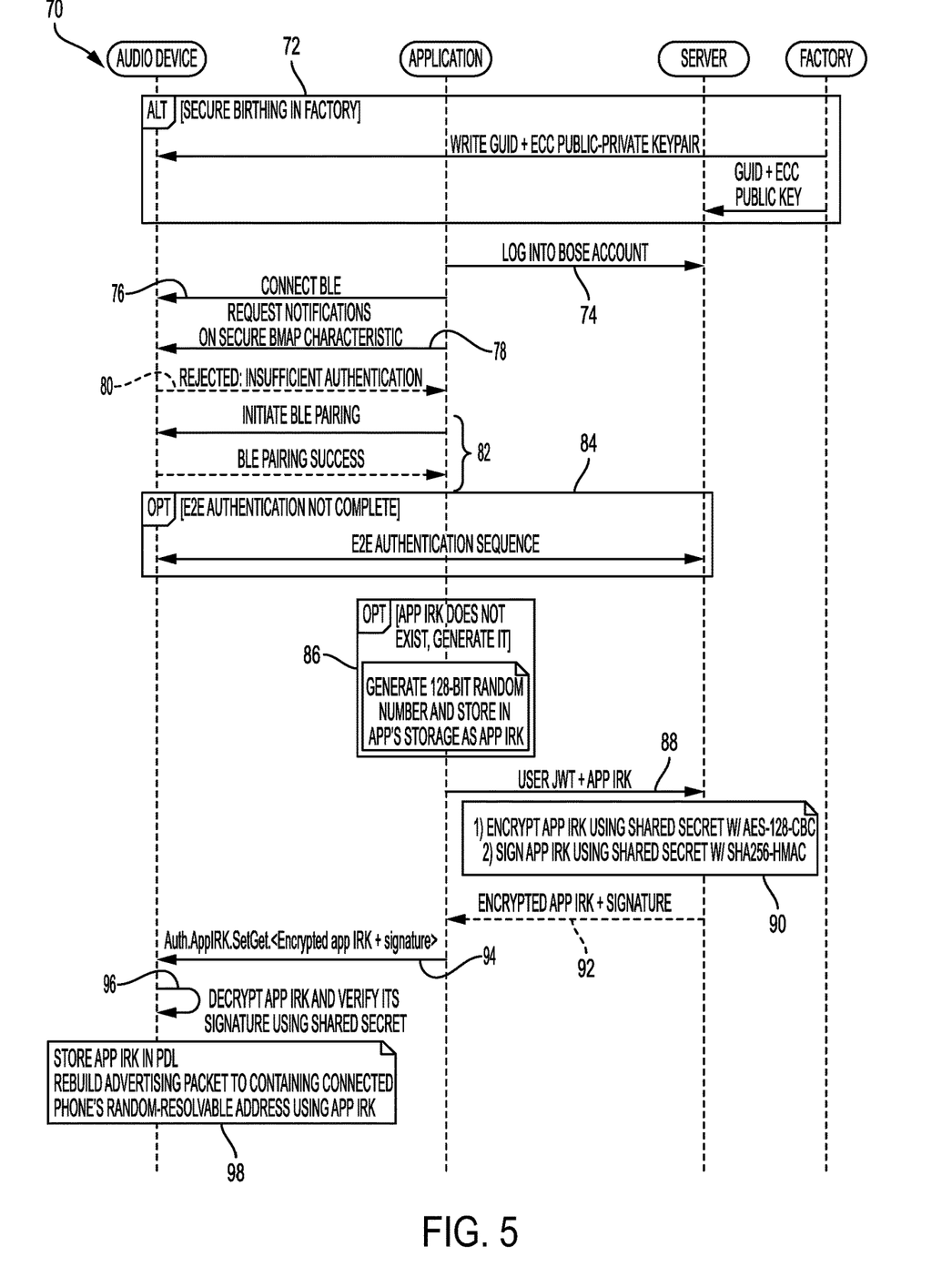
FIG. 5 is sequence diagram illustrating a method for verifying a wireless connection between a remote device and an audio device according to one example disclosed herein.

A sequence diagram describing a method 70 for securely during runtime verifying a connection between a remote device and an audio device, using an application installed on the remote device, is illustrated in FIG. 5. At step 72, an audio device (e.g., the audio device 12) is manufactured, which may include sending a globally unique identity (GUID) and public-private key pair to the audio device and to an authentication server (e.g., the server 16). The key pair may be generated according to any cryptographic methodology, such as elliptic-curve cryptography (ECC).

At step 74, the user of an application (e.g., the application 34) for remotely connecting to and/or controlling the audio device may provide authentication credentials to the authentication server. For example, this may include the user entering a user name and password to log into or access an account or user profile managed by the authentication server. The user may also use the application to initiate a connection, e.g., a BLE connection, to the audio device at a step 76 and/or to request notifications from the audio device over Generic Attribute Profile (GATT) characteristics requiring encryption at step 78. The audio device may reject the requests at step 80 due to insufficient authorization. Next, the application may initiate a BLE pairing at step 82. If additional authorization is required, an end-to-end authorization sequence (e.g., according to the E2E authorization process 40) may be carried out between the audio device and the server at step 84. The application may be approved as a relay during this process due to providing the credentials in step 74, or may need to resubmit the necessary credentials.

If the identity resolving key for the application (e.g., the app IRK 36) does not yet exist, it may be created at step 86. Similar to that discussed with respect to FIG. 2, the application IRK may then be sent to the authentication server at step 88 (e.g., generally akin to step 46). The application IRK may then be encrypted and/or signed at step 90, e.g., using a shared secret generated in step 84 (e.g., generally akin to step 48). AES-128 or other encryption technique may be utilized to encrypt the app IRK and the signature may be created in accordance with SHA-256-HMAC or any other desired methodology. The application IRK may then be sent back to the application in an encrypted state at step 92 and forwarded to the audio device at step 94 (e.g., generally akin to steps 50 and 52). At step 96, the audio device may decrypt and verify the communication using the shared secret from step 84 (e.g., generally akin to step 54). At step 98, the application IRK may be stored in memory of the audio device (e.g., the memory module 22), such as in a paired device list (PDL) and used to rebuild advertising packets broadcast by the audio device.

For example, as discussed with respect to FIG. 4, whenever the audio device is connected to an application, the audio device may use the IRK for that application instance to generate a random resolvable address and place it in its BLE advertising payload. The application, with knowledge of its own IRK, will be able to resolve its own identity from the random resolvable address. Any other BLE scanner, without knowledge of the application's IRK, will be unable to determine which application or remote device (e.g., smartphone) is connected to each audio device, in contrast to if a remote device's MAC address or other static address were used instead of the random resolvable addresses as described herein.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

The invention claimed is:

1. A method for securely verifying a connection between a remote device and an audio device, comprising:
    establishing a wireless connection between the remote device and the audio device, the remote device having an application configured to control operation of the audio device;
    obtaining an identity resolving key (IRK) for the application, wherein the IRK is obtained in an encrypted state from an authentication server;
    transmitting the IRK to the audio device from the application;
    transmitting an instruction to the audio device from the application, the instruction causing the audio device to generate a random resolvable address for the application using the IRK and to broadcast data containing the random resolvable address;
    receiving the data containing the random resolvable address by the application of the remote device; and
    identifying whether an active audio connection exists between the remote device and the audio device if the random resolvable address is able to be resolved by the application using the IRK.

2. The method of claim 1, wherein the obtaining comprises generating the IRK with the application or receiving the IRK from an authentication server.

3. The method of claim 1, further comprising establishing an application layer wireless connection between the application and the audio device, wherein transmitting the IRK, transmitting the instruction, and receiving the data are performed with respect to the application layer wireless connection.

4. The method of claim 3, wherein the wireless connection comprises a classic Bluetooth connection and the application layer wireless connection comprises a Bluetooth Low Energy connection.

5. The method of claim 1, further comprising establishing a data connection between the remote device and an authentication server, transmitting the IRK to the authentication server via the data connection, encrypting the IRK with the authentication server, and transmitting the IRK in an encrypted state to the application via the data connection, and wherein transmitting the IRK to the audio device comprises transmitting the IRK in the encrypted state.

6. The method of claim 5, further comprising completing an end-to-end authentication process between the audio device and the authentication server, and wherein the encrypting comprises encrypting the IRK using a shared secret from the end-to-end authentication process.

7. The method of claim 6, further comprising providing authentication credentials to the authentication server via the data connection, and wherein completing the end-to-end authentication process comprises using the remote device as a relay between the audio device and the authentication server only upon acceptance by the authentication server of the authentication credentials.

8. The method of claim 1, further comprising, after the verifying, automatically transmitting audio data and an instruction to process the audio data to the audio device from the remote device, updating a user interface of the application to indicate the wireless connection, or a combination including at least one of the foregoing.

9. The method of claim 1, wherein the instruction is configured to instruct the audio device to insert the random resolvable address in a Bluetooth Low Energy (BLE) advertising packet and the data includes the BLE advertising packet.

10. The method of claim 9, wherein the random resolvable address is received by the application as a first random resolvable address and the BLE advertising packet includes a random number that is refreshed periodically that is received by the application while receiving the data, and wherein the verifying includes generating a second random resolvable address with the application using the random number and the IRK and determining whether the second random resolvable address matches the first random resolvable address.

11. The method of claim 10, wherein the random number, the random resolvable address, or both, are stored in a manufacturer specific data field of the BLE advertising packet.

12. A method for securely verifying a connection between a remote device and an audio device, comprising:
   establishing a wireless connection between the remote device and the audio device, the remote device having an application configured to control operation of the audio device;
   obtaining an identity resolving key (IRK) for the application with the remote device, wherein the IRK is obtained in an encrypted state from an authentication server;
   transmitting the IRK to the audio device via the wireless connection;
   generating, by the audio device, a random resolvable address for the application using the IRK;
   broadcasting data containing the random resolvable address with the audio device;
   receiving the data with the application of the remote device; and
   identifying whether an active audio connection exists between the remote device and the audio device if the random resolvable address is able to be resolved by the application using the IRK.

13. An audio system comprising:
   a remote device having a wireless transceiver configured to establish a wireless connection with an audio device, a memory module, and an application, configured to control operation of the audio device, installed in the memory module, the remote device configured to obtain an identity resolving key (IRK) for the application and to transmit the IRK to the audio device, wherein the IRK is obtained in an encrypted state from an authentication server;
   wherein the application is configured to instruct the audio device to (i) generate a random resolvable address for the application using the IRK and (ii) broadcast data that includes the random resolvable address, to receive the data, and to identify whether an active audio connection exists between the remote device and the audio device if the random resolvable address is able to be resolved by application using the IRK.

14. The audio system of claim 13, wherein the application is configured to communicate with the audio device via a Bluetooth Low Energy (BLE) connection, and the connection between the remote device and the audio device verified by the application comprises a classic Bluetooth connection.

15. The audio system of claim 13, wherein the application is configured to automatically, after verifying the connection, transmit audio data and an instruction to process the audio data to the audio device, update a user interface of the application to indicate the connection, or a combination including at least one of the foregoing.

16. The audio system of claim 13, wherein the application is configured to receive the random resolvable address as a first random resolvable address, to generate a second random resolvable address using the IRK and a random number contained in the broadcast data, and wherein the application is configured to verify the connection by determining whether the second random resolvable address matches the first random resolvable address.

17. An audio system comprising:
   an audio device having a first wireless transceiver; and
   a remote device having a second wireless transceiver configured to establish a wireless connection with the audio device, a memory, and an application configured to control operation of the audio device installed in the memory, the remote device configured to obtain an identity resolving key (IRK) for the application and to transmit the IRK to the audio device, wherein the IRK is obtained in an encrypted state from an authentication server;
   wherein the audio device is configured to generate a random resolvable address for the application using the IRK and to broadcast data that includes the random resolvable address; and
   wherein the application is configured to receive the data and identify whether an active audio connection exists between the remote device and the audio device if the random resolvable address is able to be resolved by application using the IRK.

18. The audio system of claim 17, wherein the audio device is configured to insert the random resolvable address into a Bluetooth Low Energy (BLE) advertising packet and the data includes the BLE advertising packet.

19. The audio system of claim 17, further comprising an authentication server, wherein the application is configured to request the IRK from the authentication server and the authentication server is configured to generate the IRK.

20. The audio system of claim 19, wherein the authentication server is configured transmit the IRK to the application only after completion of an end-to-end authentication process with the audio device using the remote device as a relay.

* * * * *